Oct. 28, 1969  E. LAIMINS  3,474,875
STRAIN-GAGED TREADLE SCALES
Filed Nov. 13, 1967  3 Sheets-Sheet 1
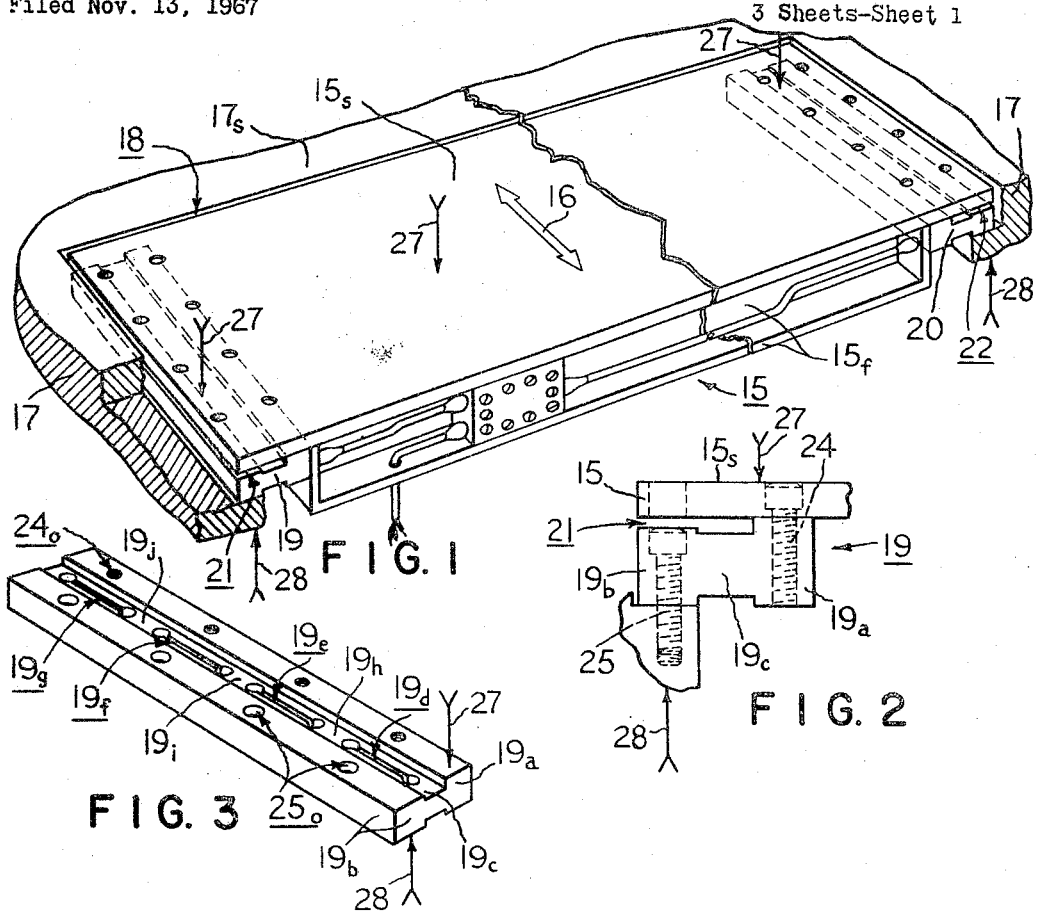
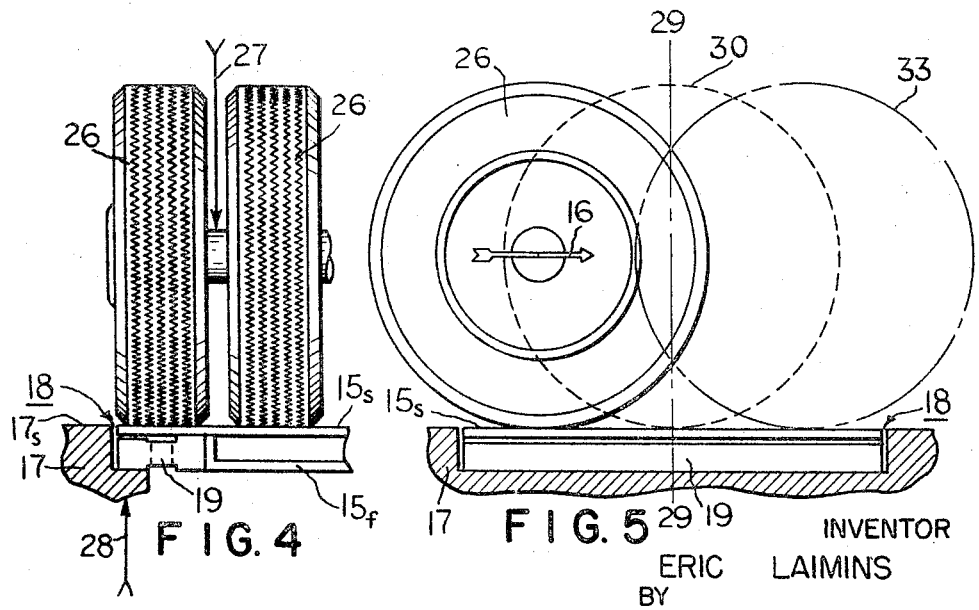
INVENTOR
ERIC LAIMINS
BY
Thomson & Mrose
ATTORNEYS

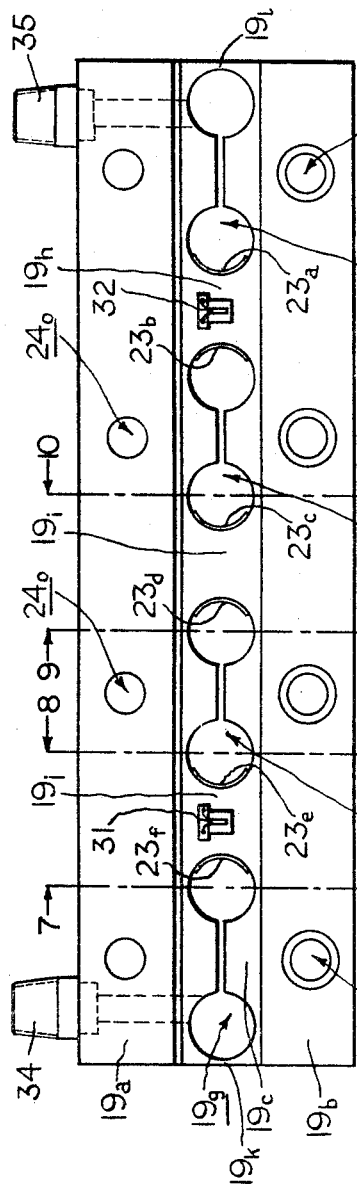

Oct. 28, 1969  E. LAIMINS  3,474,875
STRAIN-GAGED TREADLE SCALES
Filed Nov. 13, 1967  3 Sheets-Sheet 3

INVENTOR.
ERIC LAIMINS
BY
Thomson & Mrose
ATTORNEYS

United States Patent Office 3,474,875
Patented Oct. 28, 1969

3,474,875
STRAIN-GAGED TREADLE SCALES
Eric Laimins, Belmont, Mass., assignor to BLH Electronics, Inc., Waltham, Mass., a corporation of Delaware
Filed Nov. 13, 1967, Ser. No. 682,278
Int. Cl. G01g 19/02
U.S. Cl. 177—134                          23 Claims

ABSTRACT OF THE DISCLOSURE

The platform of an essentially monolithic scale having an active weighing surface flush with a roadbed for weighing of the heavy loads imposed via truck tires is edge-supported stiffly by a spaced pair of elongated shear-responsive transducers aligned with the travel directions and cantilevered to yield valid measurements under platform loadings extending to the platform edges.

Background of the invention

The present invention relates to improvements in shear-responsive electrical weighing scales which are especially well suited to measurement of vehicle-imposed loadings, and, in one particular aspect, to a novel and improved treadle scale assembly of low-height, compact and rugged construction which may be fabricated and installed economically and in which substantially rigid shear-type strain gage transducers uniquely mount a tire-supporting platform such that the assembly may accurately characterize vehicle loads experienced at the wheels.

The art of electrical weighing recognizes a wide variety of transducer devices in which electrical strain gages, such as those of the wire, foil and semiconductor types, are used to translate into electrical terms the elastic strains resulting from loading-induced stresses of elements which are in the forms of beams, columns, and the like. As a convenience, these transducers are commonly designed and fabricated as self-contained units, which enables their being adapted to a number of different uses. Generally, such devices are highly accurate only when the applied loading is centered along a predetermined axis, and this has resulted in the exploitation of auxiliary flexures and guides such as diaphragms, for small-size units, and stay rods, for such large units as massive weighing platforms. These auxiliary provisions are essentially undesirable in that they are mechanically in parallel with the sensitive transducers; the critical elastic-deformation characteristics of the transducer elements become modified by those of the paralleled members and any erratic or non-linear behavior which they exhibit will in turn impair accuracy and linearity of the desired measurements.

The problems associated with platform-type vehicle weighing via electrical strain gage transducers are particularly severe because the loads can be extremely large and there can be a substantial amount of attendant vibrational and shock force. At the same time, there is need for a high degree of accuracy, consistent with important determinations of truck weight relationships to legal weight limits and the like, and, economy and convenience dictate that the scale units should not be bulky and, further, should lend themselves well to installation upon foundation supports which require little special preparation of the foundation site. For some purposes, the scales are desirably portable, and, in other instances, they should be capable of presenting and maintaining a substantially flush relationship with a travel surface. Importantly, at least the lateral positions at which tire loadings are impressed should not be critical, due to the practical difficulties of locating a heavily-laden vehicle with great precision; further, electrical output signals should also preferably be available to characterize the optimum conditions for weight evaluation of a vehicle while its wheels are disposed on the scales.

Summary

In accordance with certain of the aspects of the present invention, it is recognized that an advantageous substantially unitary or "monolithic" weighing structure of relatively small size capable of precise and reliable measurement of intense vehicle loading may be developed by way of rugged shear-responsive suspension elements which are critically located and equipped with cooperating strain gages characterizing loading forces essentially in the vertical weighing direction alone. A plurality of the high-strength shear-responsive elements oriented to impart mechanical stability of the loading platform relative to underlying support structure obviate need for auxiliary suspension or guide members. These suspension and force-measuring elements are conveniently fashioned in relatively short form promoting underslung cantilevering relative to edges of the platform; the entire area of the loading platform, which need not exceed that of its supporting structure, remains active for weighing purposes, and the lateral locations of full tire-imposed loads are not crucial. Insensitivity to unavoidable bending effects renders the weighing system highly immune to many types of structural deformations of the foundation, although certain preferred versions, such as those which are portable, include integral rigid intermediate foundation or support structure which further isolates the system from errors of such origins. Spaced orientations of auxiliary bending-sensing strain gages, in the expected directions of vehicle travel, promote electrical responses which characterize the shifts in loading, and, hence travel direction, and which further importantly characterize the optimum conditions for the taking of weight readings from the shear-responsive gaging.

Accordingly, it is one of the objects of the present invention to provide novel and improved treadle scales in which shear-responsive suspension elements preserve a substantially rigid and monolithic construction while developing strain-gage outputs accurately related to loading under adverse environmental conditions of use.

Another object is to provide relatively small and reliable platform-type weighing equipment of low-cost rugged construction involving the sensing of weight in terms of shear effects in platform suspension members which undergo essentially negligible deflection.

Still further, it is an object of this invention to provide unique and advantageous low-height and compact weighing assemblies wherein platform suspensions are by way of a plurality of relatively stiff members proportioned to develop weight-related shear responses in associated strain gaging and wherein the responses are well isolated from effects of dimensional variations in supporting structure.

Yet another object is to provide a treadle scale, equipped with electrical strain gages, which provides accurate weight measurements when unevenly or eccentrically loaded and which characterizes direction of travel and optimum readout conditions with reference to vehicle movements thereacross.

In one practice of these teachings, a substantially rigid rectangular horizontal platform is suspended relative to a support along each of two of its opposite edges at least at two laterally-spaced positions, the suspensions at each position being through a horizontally-extending substantially stiff member of metal having a high modulus of elasticity. Each suspension member is shaped to exhibit optimum shear responses at vertically-disposed surfaces situated between its ends, the latter being securely and rigidly affixed to platform and support structures, respectively, and strain gages are mounted upon these surfaces in positions for response to the shear effects exhibited there. Criticality of positions of tire-loading of the platform is reduced by cantilevering the suspension members in underslung relationship to the platform edges, with the attachments to the support structure being aligned with platform edges. Stiff interconnections of the support-mounted ends of the suspension members minimize errors due to deformations of the foundation, and gaging of the suspension members to sense bending reactions affords information about vehicle travel direction and the optimum conditions for load measurement.

Although the features of this invention which are considered to be novel are set forth in the appended claims, further details as to preferred practices and as to the further objects and advantages thereof may be most readily comprehended through reference to the following description taken in connection with the accompanying drawings.

Brief description of the drawings

FIGURE 1 portrays an improved strain-gage type treadle scale assembly having its loading platform oriented in a level relationship with surrounding support structure, the latter being cross-sectioned;

FIGURE 2 provides a front view of a fragment of the scale assembly of FIGURE 1, at the edge site of a shear-responsive suspension-transducer unit;

FIGURE 3 is a perspective view of the suspension-transducer unit of FIGURES 1 and 2;

FIGURE 4 illustrates part of the assembly of FIGURE 1 from the front, undergoing truck-tire loading;

FIGURE 5 illustrates the arrangement of FIGURE 4 in a side view, together with dashed-line representations characterizing tire-loadings in various positions in directions of vehicle travel;

FIGURE 6 provides a top view of a suspension-transducer unit such as that of FIGURES 2 and 3;

FIGURES 7, 8, 9 and 10 are cross-sections of the same unit, taken along the correspondingly-numbered section lines in FIGURE 6;

FIGURE 11 depicts one end of a hermetically-sealed shear-responsive suspension-transducer unit, with portions broken away to expose construction details;

FIGURE 12 displays a cross-section of a suspension-transducer unit and its secure stiff fastenings with platform and support structures;

Description of the preferred embodiments

Figure 13:
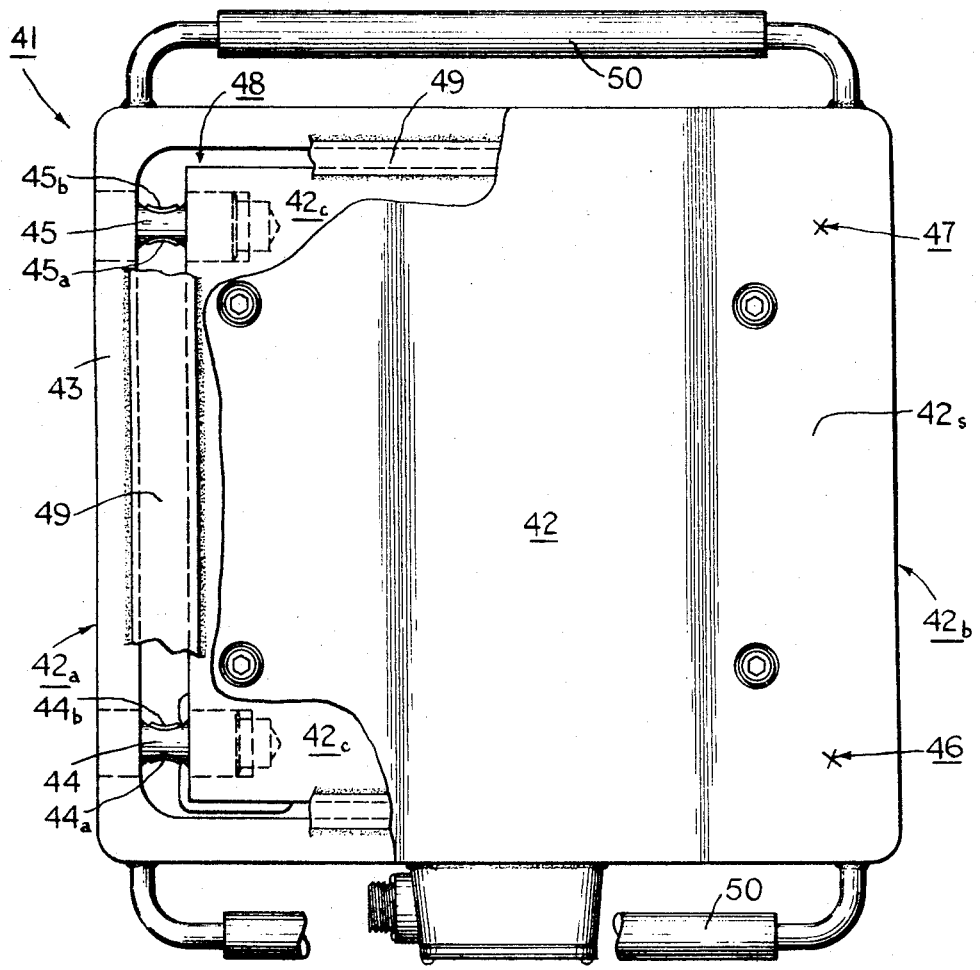
FIGURE 13 is a plan view, with portions broken away, of a portable weighing-scale assembly utilizing shear-responsive suspension-transducer units in the form of shaped pins and provided with a rigid intermediate support structure as an integral part of an assembly lending itself to a variety of weighing applications.

The treadle scale equipment appearing in FIGURE 1 includes a relatively broad-area rectangular load-receiving platform structure 15 which is of a construction which remains substantially stiff under the expected top loading applied by way of the tires of vehicles passing across it in the travel directions characterized by the arrow symbol 16. Depending framework $15_f$ aids in imparting structural strength. Both the platform upper surface $15_s$ and the surrounding travel surface $17_s$ of the supporting foundation or the like, 17, are essentially coplanar horizontally, and are separated by only a narrow gap 18 peripherally about the platform. Suspension of the platform in this relationship to the support structure is achieved and preserved wholly by the actions of two elongated substantially rigid elements, 19 and 20, independently disposed essentially along the narrower edges of the platform. These elements, which are alike and are preferably below the platform edges and do not extend appreciably beyond them, as shown, are fixed securely with the platform inwardly of the peripheral edges of the platform and extend laterally outward, in cantilevered relation to the platform, to the edge-aligned positions where they are fixed securely to the support structure 17. The later cantilevering is associated with measurements, and, to promote such purposes, the shallow gaps, 21 and 22, are left between the platform and laterally-extending parts of elements 19 and 20, respectively.

As appears more fully in FIGURES 2 and 3, the elongated support element is of generally rectangular cross-sectional shape, its longitudinally-extending edge portions $19_a$ and $19_b$ being somewhat thicker and structurally stiffer than the integral intermediate portion $19_c$ which has a number of relatively wide openings $19_d$–$19_g$ extending through it in the vertical direction. These wide openings, shown more clearly in FIGURE 6, extend essentially lengthwise of the element and subdivide its mid-portion $19_c$ into three discrete load-sustaining sections, $19_h$–$19_j$, the inner and outer ends of which are respectively united by their junctures with the thicker edge portions $19_a$ and $19_b$. Strain gages $23_a$–$23_f$ (FIGURE 5) respond to shear-related effects displayed alongside these three sections, as is discussed further later herein. For these shear-related effects to be developed, the element edge portions $19_a$ and $19_b$ must be separately secured to the platform structure 15 and support structure 17 in laterally-spaced relationship, and bolts 24 and 25 cooperating with bolt-receiving openings $24_o$ and $25_o$ serve to make the needed fastenings which integrate the element with both the platform and support structures. Inner edge portion $19_a$ of the element is made somewhat higher than the other portions of the element, and is secured along the under side of platform 15 inwardly of its narrower edge, such that the element does not protrude beyond that edge. Because of the aforementioned shallow gap 21, and because of the fastening of the outer edge portion $19_b$ of the element atop part of the support 17, the element is oriented for optimum responses in shear. Loading of the platform at any position along its surface $15_s$ will advantageously be effective to develop related shear effects in one sense simultaneously in both of the support elements 19 and 20.

Vehicle tires 26 in FIGURE 4 may extend to substantially the narrower edge of platform 15, as shown, while nevertheless not tending to overturn the platform and while applying their full loading forces to the edge-located transducer elements in the vertical direction which causes shear in the mid-sections of these elements. Arrows 27 in FIGURES 1–4 characterize the vertical downward loading forces which are applied solely to the platform-connected inner edge portions, such as portion $19_a$, of the two suspension elements 19 and 20, and the reactions of support 17 are in the opposite upward vertical directions of arrows 28 and are applied solely to the support-connected outer edge portions, such as portion $19_b$, of these two suspension elements. Accordingly, the relatively small but high-strength sections of the mid-portions of these elements, such as sections $19_h$–$19_j$, experience a high degree of shearing, albeit less than would cause them to become permanently deformed. Advantageously, the shear sections $19_h$–$19_j$ does not and need not undergo appreciable mechanical deflection to develop accurate shear-related characterizations of the loading via the aforementioned strain gages $23_a$–$23_f$ bonded alongside these sections. Therefore, the platform surface $15_s$ remains substantially flush with the surrounding surfaces $17_s$ even under severe loading. Moreover, the rigid inter-connections of the shear sections, by way of the stiff edge portions $19_a$ and $19_b$ of the elements, tends to cause them to share the loading well despite eccentric positioning of loads and despite possible unevenness of support by the supporting structure 17.

Responsiveness to shear effects, versus bending, is also highly important to the elimination of certain errors due to temperature- and loading-induced dimensional changes in both the platform and support structures. With the gages $23_a$–$23_f$ applied to have the arrangements depicted in FIGURES 7–10, the gages lend themselves to bridge-circuit interconnections of well-known form which will yield electrical outputs characterizing essentially the vertical loading forces alone, i.e. those vertical forces which produce the vertical shearing effects in the mid-sections $19_h$–$19_j$. The gages display linearities which promote measurement accuracy regardless of load distributions. Bending effects, which undesirably tend to reflect forces other than those of interest, do not enter into the measurements, and thus a high degree of beneficial isolation from spurious forces is realized.

Although there is advantageous sharing of loading by the shear sections, with the load distributions being essentially non-critical, it is nevertheless of obvious importance that the loading be wholly upon the platform surface when measurements are made. Moreover, the optimum reductions in error, particularly insofar as these may reflect unavoidable linearity differences in the gaged sections which are functioning as transducers, are achieved when the loading is substantially centered. For example, the truck tires 26 in FIGURES 4 and 5 are preferably in the centered dashed-line orientation, designated by reference characters 29—29 and 30, when the scale is being read. The centered orientation is therefore determined through reference to the outputs of additional strain gages, such as 31 and 32 in FIGURE 6, which are applied to the mid-sections $19_h$ and $19_j$ on opposite sides of the center position 29—29 and which respond principally to the bending effects witnessed by these sections. Because these bending-effect gages are widely spaced in the travel direction 16, and because the bending responses tend to vary appreciably with load orientations, these gages will develop different electrical outputs which characterize the tire-loading locations. With reference to FIGURE 5, it will be found, for example, that gage 31 develops a large response when the tires 26 are in the illustrated full-line position, that both gages tend to exhibit about the same responses when the tires are centered at position 30, and that gage 32 produces the larger response when the tires move on to the position 33 outlined in doubly-dashed linework. The bending-effect gages thus afford information which will identify the centered loading condition which is optimum for measurement, and it will then be certain that the tires do not rest upon the forward or rearward travel surfaces $17_s$ while readings are being taken. Further, the order in which these displaced gages respond more intensely to the loading characterizes the direction of vehicle travel, such that this useful information will be developed for use in automatic monitoring particularly.

It will be recognized that the shear-responsive gages $23_f$ and $23_c$ are oriented to respond to compression effects, and that gages $23_e$ and $23_d$ respond to tension effects at their measurement sites; similarly, gages $23_b$ and $23_a$ respond to tension and compression effects, respectively, in the illustrated construction. Preferably, the electrical connections for the gages are led through coupling ports such as 34 and 35 (FIGURE 6), and, in instances where hermetic sealing is desirable, highly flexible members such as seals 36 and 37 (FIGURE 11) may be bonded across the top and bottom of the element mid-portion $19_c$ without noticeably interfering with the measurements. The longitudinal extremities of each element may likewise be left closed, as at $19_k$ and $19_l$ in FIGURE 6, the wall material there being made very thin to prevent by-pass of the loading intended to develop shear effects in the thicker mid-sections $19_h$–$19_j$. As is represented in FIGURE 12, the space 21 between the platform 15 and its underslung cantilevered edge support and measurement transducer 19 may also be protectively occupied by a readily-deformable filler 37, such as one of an elastomeric material, shown as sponge rubber, which prevents foreign matter from lodging there and by-passing loading intended for the trasnducer; its own load-shunting actions are negligible.

Space 38 below the transducer element 19 and the underlying support 17′ for it is also preserved mechanically free to avoid unwanted by-pass actions, and is likewise occupied by a protective sponge-rubber filler, 39, which exhibits no appreciable restraint. In the FIGURE 12 embodiment, 17′ is an intermediate rigid support member of the same width as element 19 and to which the element 19 is securely fastened along its outer edge by bolts such as 25′, and the foundation or other main support 17″ in turn underlies and mounts the intermediate support upon a pressure-distributing pad 40. The center of pressure in such an arrangement tends to be advantageously in vertical alignment with the vertical shear plane across which the shear-responsive strain gages lie, and support irregularities are essentially evened out. In connection with the foregoing descriptions, it has of course been assumed that both of the suspension-transducer elements 19 and 20 and their associations with cooperating structure are substantially the same, and that they function similarly.

Figure 14:
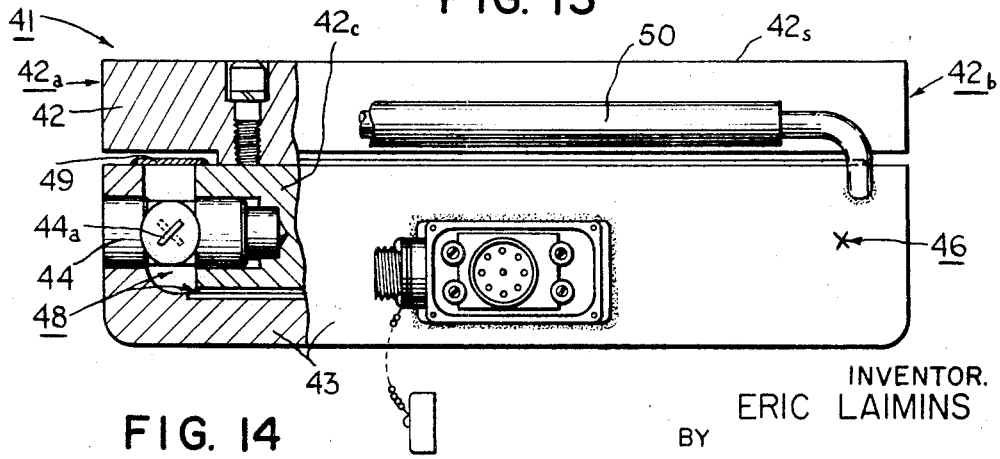
FIGURE 14 providees a front view of the assembly of FIGURE 13, with an edge portion thereof being broken away and in part cross-sectioned.

The portable platform-type scale 41 appearing in FIGURES 13 and 14 likewise includes a rigid high-strength platform structure, 42, which is suspended in relation to a rigid high-strength support framework 43 near each of two opposite edges, $42_a$ and $42_b$, by a plurality of gaged shear-sensing members. The two gaged edge-supporting members 44 and 45 which are visible in the illustrations are conveniently in the form of sturdy laterally-extending pins or rods, the ends of which are fitted into and securely integrated with the platform and framework structures, respectively, as shown. A like pair of gaged members appears at the opposite side of the assembly, at the positions designated by reference characters 46 and 47. Platform loading may extend to the edges of the top plate surface $42_s$, and will nevertheless create measurement-inducing shearing effects in the gaged members cantilevered in inwardly-extending relation to the framework 43. A broad-area active weighing surface is developed by constructing the top plate such that it is laterally coextensive with the underlying framework, and the depending rigid central portion $42_c$ of the platform structure is conveniently nested within the latter framework. The mid-portions of thick pins 44 and 45 are reduced in width to exhibit relatively thin vertically-extending shear sections to which gages such as gages $44_a$, $44_b$, $45_a$ and $45_b$ may be applied and connected to respond essentially to the vertical shearing induced by vertically-oriented loading forces. When the framework 43 is stiff, unwanted deformations due to irregularities of the support surface on which it may be rested are avoided. Preferably, it is also fully closed along the bottom and sides, and, thus, a full hermetic sealing of the gaged elements, and protection against clogging of the free spaces 48 between the platform and framework structures, may be realized by a peripheral flexible seal 49. Handles, such as handles 50 secured to the framework, provide an aid in transporting the relatively lightweight but heavy-duty scale. Gaging and electrical network arrangements of the same may be accomplished in a variety of known ways, and the mechanical assemblies used obviously may assume many forms within the province of these teachings. Accordingly, it should be understood that the specific embodiments and practices which have been depicted and described herein have been presented by way of disclosure rather than limitation, and those skilled in the art will appreciate that various modifications, combinations and substitutions may be effected without departure from the spirit and scope of this invention in its broader aspects.

What I claim as new and desire to secure by Letters Patent of the United States is:

1. Weight-responsive apparatus comprising a substantially rigid platform structure having a top loading surface of relatively broad area, a plurality of laterally-spaced horizontally-extending members which are substantially stiff and of material having a relatively high modulus of elasticity, means rigidly securing one end of each of said members to said platform structure below and laterally inwardly of the periphery of said loading surface and means for mounting the other ends of said members upon a support with said members providing substantially the sole mechanical mounting of said platform structure relative to the support each in a substantially horizontal orientation, each of said members having a shear-responsive portion between its ends with side surfaces extending substantially vertically, said shear-responsive portion of each of said members and said other ends of said members being in spaced relation to said platform structure, and electrical strain gage means including strain gages bonded to said side surfaces of said portions of said members for characterizing responses to vertical-shear-related elastic deformations induced in said portions by vertical loading of said surface of said platform structure.

2. Weight-responsive apparatus as set forth in claim 1 wherein a plurality of said members is disposed near each of two opposite margins of said platform structure, with said members near each of said margins extending laterally in a direction different from but parallel to that in which said members near the opposite margin extend, said members near each of said margins being horizontally spaced transversely to said direction.

3. Weight-responsive apparatus as set forth in claim 1 wherein said means for mounting the other ends of said members upon a support includes means stiffly interconnecting said other ends of a plurality of said members.

4. Weight-responsive apparatus as set forth in claim 3 wherein said interconnecting means comprises a rigid support underlying and substantially coextensive with said platform structure and rigidly connecting all of said other ends of said members together.

5. Weight-responsive apparatus as set forth in claim 3 wherein said means securing said one end of each of said members to said platform structure orients said portion and said other end of each of said members below and in vertically spaced relation to the under side of the periphery of said platform.

6. Weight-responsive apparatus as set forth in claim 4 wherein each of said horizontally-extending members comprises a substantially cylindrical pin having said portion of reduced cross-section between its ends, the ends of said pin being fixed with said platform structure and support, respectively.

7. Weight-responsive apparatus as set forth in claim 6 wherein said rigid support is substantially cup-shaped and fully closed along the bottom and upstanding side walls, said other ends of said pins being fitted into said walls with said pins extending horizontally inwardly of said walls, said platform structure being at least partly mated within said support in at least a partly-closing relation thereto, and flexible seal means closing the spacing being said walls and said platform structure above said pins, said platform structure seal means and support together providing a seal for all of the gaged pins and blocking entry of foreign matter into spaces between said platform structure and support.

8. Weight-responsive apparatus as set forth in claim 7 wherein said platform structure and support are of substantially rectangular outline, and wherein said loading surface of said platform structure is formed by a substantially flat plate substantially coextensive with the periphery of said support and disposed in vertically-spaced relation to said seal means and said support walls.

9. Weight-responsive apparatus as set forth in claim 8 including two of said pins fitted into each of two opposite side walls of said support at horizontally-spaced positions therealong.

10. Weight-responsive apparatus as set forth in claim 5 wherein said platform structure is substantially rectangular, and wherein a plurality of said members is disposed near each of two opposite edges of said platform structure, each of said plurality of members near each of said edges comprising an integral portion of an elongated edge-support unit including rigid spaced parallel portions interconnected at a plurality of spaced positions therealong by transverse portions having said side surfaces.

11. Weight-responsive apparatus as set forth in claim 10 wherein each of said elongated edge-support units is of substantially rectangular cross-section, said transverse portions being separated therealong by a plurality of longitudinally-spaced openings.

12. Weight-responsive apparatus as set forth in claim 11 wherein each of said edge-support units underlies the periphery of one of said edges of said platform structure with one of said parallel portions and the transverse portions in vertically-spaced relation to the under side of said one of said edges and forming a gap therewith, said means rigidly securing said one end of each of said members securing the other of said parallel portions of said unit with said platform structure inwardly of said one of said parallel portions.

13. Weight-responsive apparatus as set forth in claim 12 further comprising relatively soft elastic filler material closing each of the gaps between said edges of said platform structure and said vertically-spaced portions of said edge-support units.

14. Treadle scale apparatus responsive to weights imposed by vehicle wheels, comprising a substantially rigid platform structure having a substantially flat loading surface of relatively broad area accommodating at least one vehicle wheel thereon, a plurality of substantially stiff suspension members of metal having a relatively high modulus of elasticity, means rigidly securing one end of each of a plurality of said members to said platform structure below and inwardly of each of two opposite edges of said loading surface, means for mounting the other end of each of said members upon a support with said members providing substantially the sole mechanical mounting of said platform structure relative to the support each in a substantially horizontal orientation, each of said members having a shear-responsive portion between its ends with side surfaces extending substantially vertically, said shear-responsive portion of each of said members and said other end of each of said members being in spaced relation to said platform structure, and electrical strain gage means including strain gages bonded to said side surfaces of said portions of said members for characterizing response to vertical shear-related elastic deformations induced in said portions by vertical loading of said surface of said platform structure by vehicle wheels.

15. Treadle scale apparatus as set forth in claim 14 wherein each of said plurality of members secured to said platform structure at each of said edges is horizontally spaced in relation to other of said members in directions corresponding to intended travel directions of vehicle wheels across said surface.

16. Treadle scale apparatus as set forth in claim 15 further comprising at least one strain gage bonded to a surface of said portion of each of at least two of said members in position to respond to bending-related elastic deformations induced in said portion by loading of said platform structure by vehicle wheels, said two members being horizontally displaced in said directions and the further strain gages thereby characterizing the positions of the loading by the vehicle wheels in said directions.

17. Treadle scale apparatus as set forth in claim 15 wherein said plurality of members at each of said edges is an integral part of an elongated edge-support unit including two parallel rigid horizontally-spaced bar elements integrally joined transversely at spaced positions therealong by said portions of reduced cross-section.

18. Treadle scale apparatus as set forth in claim 17 wherein each of said units is substantially rectangular in cross-section with said shear-responisve portions being formed between longitudinally-spaced openings extending substantially vertically, and wherein said means rigidly securing one end of said members to said platform structure secures one of said bar elements of each of said units to an under side of said platform structure inwardly of an edge thereof with the remainder of each said unit in a shallow vertically-spaced relation to overhanging portions of said platform structure, said means for mounting said other ends of said members comprising means for rigidly securing the other of each of said bar elements with a support.

19. Treadle scale apparatus as set forth in claim 18 further comprising relatively soft elastic material filling the relatively shallow spaces between said overhanging portions of said platform structure and said remainders of said units.

20. Treadle scale apparatus as set forth in claim 15 further comprising a support structure having substantially flat top surfaces, and means rigidly securing said other ends of said members with said support structure in position wherein said members suspend said platform structure loading surface substantially flush with said support structure top surfaces in adjacent closely-spaced relation therewith.

21. Weight-responsive apparatus as set forth in claim 1 further including substantially horizontal intermediate support means of at least substantially the same span as each of said members, means rigidly connecting said intermediate support means with said other ends of said members below said other ends and in vertically-spaced relation to the under sides of the said shear-responsive portions and said one ends of said members, said intermediate support means extending inwardly from said other ends of said members, and means for mounting said intermediate support means upon the support.

22. Treadle scale apparatus as set forth in claim 14 further including intermediate support means underlying said members, means rigidly connecting said intermediate support means with said other ends of said members and in vertically-spaced relation to the under sides of the said shear-responsive portions and said one ends of said members, and means for mounting said intermediate support means upon the support.

23. Treadle scale apparatus as set forth in claim 22 wherein said means for mounting said intermediate support means includes pressure-distributing pad means between the support and said intermediate support means.

References Cited

UNITED STATES PATENTS

| | | | |
|---|---|---|---|
| 2,499,033 | 2/1950 | Oberholtzer | 177—211 XR |
| 2,597,751 | 5/1952 | Ruge | 177—211 XR |
| 2,681,566 | 6/1954 | Ruge | 177—211 XR |
| 2,786,669 | 3/1957 | Safford et al. | 177—211 |
| 2,793,851 | 5/1957 | Ruge | 177—211 |
| 3,082,834 | 3/1963 | Ellis | 177—229 XR |
| 3,241,626 | 3/1966 | Woodburn | 177—211 XR |
| 3,266,584 | 8/1966 | Lee | 177—211 XR |
| 3,322,220 | 5/1967 | Bash | 177—211 XR |

ROBERT S. WARD, JR., Primary Examiner

U.S. Cl. X.R.
177—211, 229